United States Patent
Sato

(10) Patent No.: US 7,602,983 B2
(45) Date of Patent: Oct. 13, 2009

(54) WAVELET TRANSFORMATION APPARATUS

(75) Inventor: Hiroki Sato, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 984 days.

(21) Appl. No.: 11/079,138

(22) Filed: Mar. 15, 2005

(65) Prior Publication Data

US 2005/0207665 A1 Sep. 22, 2005

(30) Foreign Application Priority Data

Mar. 16, 2004 (JP) ............................. 2004-074542

(51) Int. Cl.
*G06K 9/00* (2006.01)
*G06K 9/36* (2006.01)
*H04N 11/02* (2006.01)

(52) U.S. Cl. .................. 382/240; 382/276; 375/240.19

(58) Field of Classification Search ................ 382/169, 382/240, 248, 250, 276, 280, 281, 302, 277; 375/240.18, 240.19, 258; 704/203, 269; 715/236, 249; 700/194, 251; 708/5, 400, 708/404, 405, 820
See application file for complete search history.

(56) References Cited

U.S. PATENT DOCUMENTS

2002/0168113 A1 11/2002 Nakayama

2003/0088598 A1 * 5/2003 Nakayama .................. 708/300
2003/0169937 A1 * 9/2003 Mizuno et al. .............. 382/240

FOREIGN PATENT DOCUMENTS

| JP | 2001-285643 A1 | 10/2001 |
| JP | 2002-359849 A1 | 12/2002 |
| JP | 2003-142989    | 5/2003  |
| JP | 2003-142989 A  | 5/2003  |
| JP | 2003-283840    | 10/2003 |
| JP | 2003-283840 A  | 10/2003 |
| JP | 2003-283841    | 10/2003 |
| JP | 2003-283841 A  | 10/2003 |
| JP | 2003-324613    | 11/2003 |
| JP | 2003-324613 A  | 11/2003 |

* cited by examiner

*Primary Examiner*—Abolfazl Tabatabai
(74) *Attorney, Agent, or Firm*—Arent Fox LLP.

(57) ABSTRACT

A wavelet transformation apparatus including a unit that comprises a first adding device that adds a first input signal and a second input signal input by a predetermined order, a first multiplying device that multiplies an output of the first adding device with a coefficient; a second adding device that adds a fixed value to the output of the first adding device, a first switching device that switches the output of the first adding device and an output of the second adding device; a second multiplying device that multiplies an output of the first switching device with a coefficient, a second switching device that switches an output of the first multiplying device and an output of the second multiplying device, and a third adding device that adds a third input signal of a predetermined order to an output of the second switching device.

10 Claims, 6 Drawing Sheets

FIG. 3-1A $$Y_{(2n+1)} = X_{(2n+1)} + \alpha(X_{(2n)} + X_{(2n+2)}) \quad \cdots \quad (1)$$

$$Y_{(2n)} = X_{(2n)} + \beta(Y_{(2n-1)} + Y_{(2n+1)}) \quad \cdots \quad (2)$$

$$Y_{(2n+1)} = X_{(2n+1)} + \gamma(Y_{(2n)} + Y_{(2n+2)}) \quad \cdots \quad (3)$$

$$Y_{(2n)} = X_{(2n)} + \delta(Y_{(2n-1)} + Y_{(2n+1)}) \quad \cdots \quad (4)$$

$$Y_{(2n+1)} = K Y_{(2n+1)} \quad \cdots \quad (5)$$

$$Y_{(2n)} = (1/K) Y_{(2n)} \quad \cdots \quad (6)$$

FIG. 3-1B $$X_{(2n)} = K Y_{(2n+1)} \quad \cdots \quad (11)$$

$$X_{(2n+1)} = (1/K) Y_{(2n)} \quad \cdots \quad (12)$$

$$X_{(2n)} = X_{(2n)} - \delta(X_{(2n-1)} + X_{(2n+1)}) \quad \cdots \quad (13)$$

$$X_{(2n+1)} = X_{(2n+1)} - \gamma(X_{(2n)} + X_{(2n+2)}) \quad \cdots \quad (14)$$

$$Y_{(2n)} = X_{(2n)} - \beta(X_{(2n-1)} + X_{(2n+1)}) \quad \cdots \quad (15)$$

$$X_{(2n+1)} = X_{(2n+1)} - \alpha(X_{(2n)} + X_{(2n+2)}) \quad \cdots \quad (16)$$

FIG. 3-2A $$Y_{(2n+1)} = X_{(2n+1)} - \left\lfloor \frac{X_{(2n)} + X_{(2n+2)}}{2} \right\rfloor \quad \cdots \quad (21)$$

$$Y_{(2n)} = X_{(2n)} + \left\lfloor \frac{Y_{(2n-1)} + Y_{(2n+1)} + 2}{4} \right\rfloor \quad \cdots \quad (22)$$

FIG. 3-2B $$X_{(2n)} = Y_{(2n)} - \left\lfloor \frac{Y_{(2n-1)} + Y_{(2n+1)} + 2}{4} \right\rfloor \quad \cdots \quad (23)$$

$$X_{(2n+1)} = Y_{(2n+1)} + \left\lfloor \frac{X_{(2n)} + X_{(2n+2)}}{2} \right\rfloor \quad \cdots \quad (24)$$

WAVELET TRANSFORMATION APPARATUS

CROSS REFERENCE TO RELATED APPLICATION

This application is based on Japanese Patent Application 2004-074542, filed on Mar. 16, 2004, the entire contents of which are incorporated herein by reference.

BACKGROUND OF THE INVENTION

A) Field of the Invention

This invention relates to a data compression technique for a digital image signal, and more in detail, relates to wavelet transformation.

B) Description of the Related Art

An image, especially a multi-level image, includes an enormous amount of data, and it causes a problem that the data amount is enormous when an input signal is transmitted or stored. Therefore, a highly efficient coding for compressing the data amount will be executed by omitting lengthiness of the image or by simplifying the image to a degree that deterioration will not be recognized before storing or transmitting the image signal.

Conventionally, in the JPEG Standard, the image data is divided into blocks of an 8×8 pixel, and the image data is transformed into DCT coefficients by executing discrete cosine transform (DCT) for each block, and thereafter data compression will be executed. When a compression rate in quantization is increased, a data compression rate becomes large. Small data after the quantization is abandoned so that the transformation is a lossy (non-reversible) transformation. Since the data compression is executed by each block in the DCT, so-called block distortion may be appeared at the borders of the blocks.

In the JPEG 2000, a wavelet transformation is suggested as a transformation process to be executed before the quantization. The wavelet transformation is not executed by each block, but the input data is sequentially processed. Therefore, deterioration of compound image becomes difficult to be visually recognized.

FIG. 6A is a block diagram schematically showing a wavelet transformation apparatus. Input signal X is an image signal of a raster-scanning format. A series of the image data is supplied to a low-pass filter (LPF) 61 and a high-pass filter (HPF) 62, and each of them outputs a low frequency component Y of the wavelet transformation coefficient or a high frequency component $Y^{-1}$.

FIG. 6B is a plan view schematically showing the wavelet-converted image signal. A low frequency component L and a high frequency component H of the wavelet transformation coefficients are respectively arranged into horizontally divided regions 65 and 66 and form a screen 64 of the wavelet transformation coefficients.

The wavelet transformation is executed not only in a horizontal direction but also in a vertical direction. By the wavelet transformation in the vertical direction, the low frequency component L of the horizontal direction for the region 65 is divided into a low frequency component LL of the horizontal and the vertical directions for the region 65-1 and a component LH of which horizontal direction is high frequency and vertical direction is low frequency for region 65-2. Similarly, the horizontal direction high frequency component H for the region 66 is divided into a component HL of which horizontal direction is high frequency and vertical direction is low frequency for region 66-1 and a component HH of which horizontal and vertical directions are high frequency for region 66-2.

As described in the above, frequency division can be executed for each component obtained by the above process. By repeating the wavelet transformation, the frequency components in the image signal can be divided into a desired degree.

As a wavelet transformation, 9×7 format and 5×3 format are well known. In the wavelet transformation, operations for extracting a high frequency component and a low frequency component to a series of the image signals are repeated. For example, Japanese Laid-Open Patent 2001-285643 suggests storing a wavelet coefficient necessary in later operation in a storing device for simplifying the structure of an operation apparatus. Also, for example, Japanese Laid Open Patent 2002-359849 suggests using a turn-around rotation unit for executing the wavelet transformation in vertical direction and horizontal direction in the same operation circuit.

As the wavelet transformation, although, the 9×7 format and the 5×3 format are used, each filter used in each format has different structures. Therefore, when the wavelet transformation apparatus that can use both of the 9×7 format and the 5×3 format is consisted, the number of the components increases, and the structure becomes complicated.

SUMMARY OF THE INVENTION

It is an object of the present invention to provide a wavelet transformation apparatus that can realize both of 9×7 format and 5×3 format by a single circuit structure.

It is an object of the present invention to provide a wavelet transformation apparatus that can realize the 9×7 format and the 5×3 format while the structure is simplified more than independently structuring the wavelet transformation apparatus for the 5×3 format and the wavelet transformation apparatus for the 9×7 format.

According to one aspect of the present invention, there is provided a wavelet transformation apparatus including a unit, the unit comprising: a first adding device that adds a first input signal and a second input signal input by a predetermined order; a first multiplying device that multiplies an output of the first adding device with a coefficient; a second adding device that adds a fixed value to the output of the first adding device; a first switching device that switches the output of the first adding device and an output of the second adding device; a second multiplying device that multiplies an output of the first switching device with a coefficient; a second switching device that switches an output of the first multiplying device and an output of the second multiplying device; and a third adding device that adds a third input signal of a predetermined order to an output of the second switching device.

A wavelet transformation apparatus for both of the 9×7 format and the 5×3 format can be realized and the structure of that can be simplified.

BRIEF DESCRIPTION OF THE DRAWINGS

FIG. 3 are diagrams showing transformation equations of the 9×7 format and the 5×3 format.

DETAILED DESCRIPTION OF THE PREFERRED EMBODIMENTS

Figure 1A:
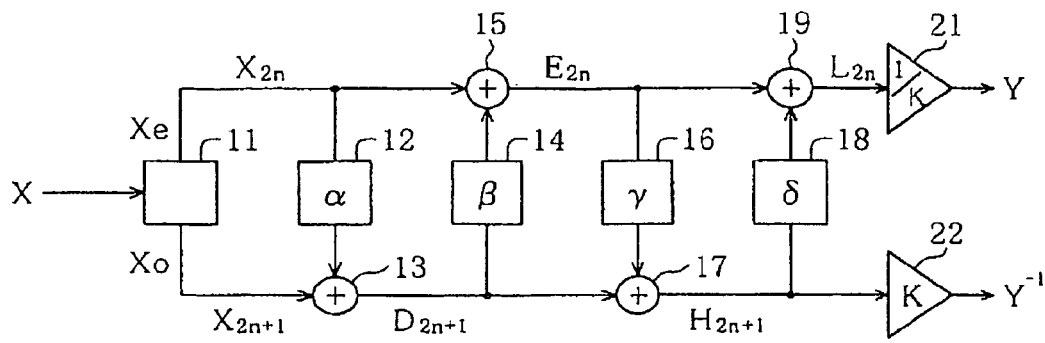
FIGS. 1A to 1E are block diagrams for explaining a wavelet transformation with a 9×7 format.

First, a wavelet transformation apparatus with 9×7 format is explained. FIG. 1A is a block diagram showing a lifting structure of the wavelet transformation apparatus with the 9×7 format. An input signal X is supplied to a classifying unit 11 and is classified into an odd sequence or an even sequence. Then, a signal X$2n$+1 in the odd sequence is supplied on an odd-numbered signal line Xo, and a signal X$2n$ in the even sequence is provided on an even-numbered signal line.

An adding unit 13 is connected to the odd-numbered signal line Xo. A multiplying unit 12 and an adding unit 15 are connected in parallel to the even-numbered signal line Xe. The multiplying unit 12 multiplies a coefficient α and supplies the output to the adding unit 13. The adding unit 13 inputs the input signal X$2n$+1 in the odd sequence and the input signal X$2n$α in even sequence that has been multiplied by the coefficient α, and outputs an added signal D$2n$+1. The output signal of the adding unit 13 is supplied to a multiplying unit 14 and an adding unit 17.

The adding unit 15 inputs the input signal X$2n$ in even-numbered sequence and a signal D$2n$+1 multiplied by a coefficient β, and output an added output E$2n$. The output signal of the adding unit 15 is supplied to a multiplying unit 16 and an adding unit 19. The multiplying unit 16 multiplies the output signal E$2n$ of the adding unit 15 by a coefficient γ, and supplies E$2n$γ to an adding unit 17. The adding unit 17 inputs the output signal D$2n$+1 of the adding unit 13 and the output signal E$2n$γ of the multiplying unit 16, and outputs an added signal H$2n$+1. The output signal of the adding unit 17 is supplied to a multiplying unit 18 and a normalizing circuit 22. The normalizing circuit 22 executes normalization to supply a high frequency output signal $Y^{-1}$.

The multiplying unit 18 multiplies the output signal H$2n$+1 of the adding unit 17 by a coefficient δ, and supplies (H$2n$+1)δ to an adding unit 19. The adding unit 19 receives the output signal E$2n$ of the adding unit 15 and the output signal (H$2n$+1)δ of the multiplying unit 18, and outputs an added output signal L$2n$. The output signal of the adding unit 19 consists a low frequency output signal Y via a normalizing circuit 21.

Here, each one of the adding units 13, 15, 17 and 19 adds two continuous input signals input in one input terminal shown in a horizontal direction and adds or subtracts one input signal (the output signal of the multiplying unit 12, 14, 16 or 18) input from another input terminal shown in a vertical direction to or from the added two continuous input signals.

Figure 1B:
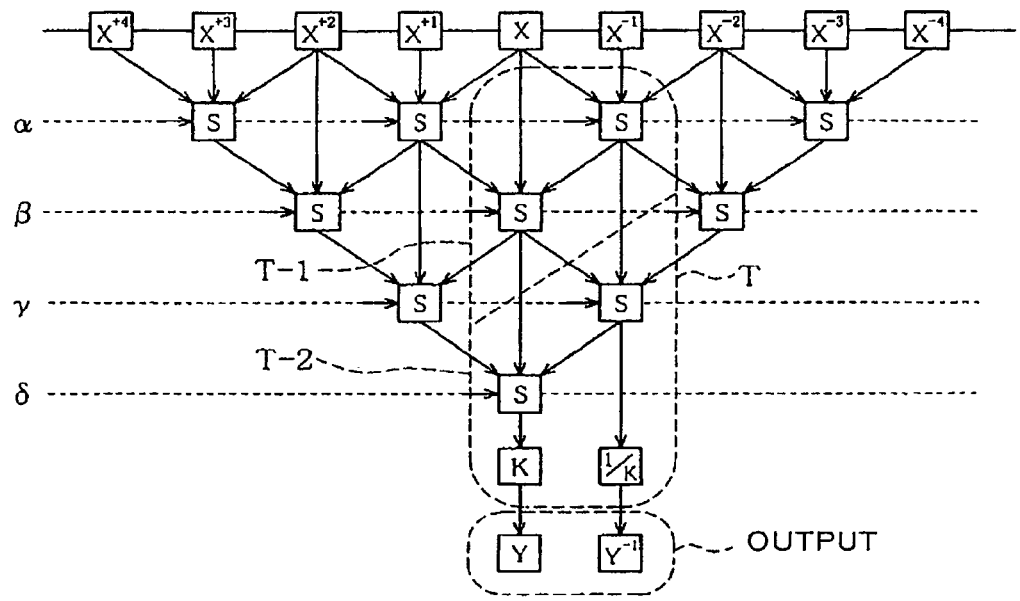

FIG. 1B is a block diagram schematically showing contents of operation executed by a lifting structure shown in FIG. 1A. Input signals $X^{-4}$, $X^{-3}$, $X^{-2}$ . . . are the input signals sequentially input. Macros S input three input signals and the coefficient and supply the output. Normalizing circuits K and 1/K are the circuits for executing the normalization. Output of the normalization circuit K consists the low frequency component Y, and output of the normalization circuit 1/K consists the high frequency component $Y^{-1}$.

The input signals X are the signal sequentially supplied with the timing signal and the operation shown in FIG. 1B is an operation sequentially executed in accordance with the timing signal. Considering the operation circuit that executes the operation by each timing, the circuits shown in the diagram may not exists at the same time. For example, if there is a circuit surrounded by a dashed line T, a necessary operation can be executed by storing the operation result in a buffer memory.

FIG. 3-1 shows lossy filter transformation equations. FIG. 3-1A is transformation equations (1) to (6) of forward transformation, and FIG. 3-1B are transformation equations (11) to (16) of inverse transformation. The forward transformation and the inverse transformation are contrast equations, the operation can be executed by using the same circuit. Hereinafter, mainly examples of the forward transformation are explained. The equations (1) to (4) are the operation executed by the adding unit 13, 15, 17 and 19. The equations (5) and (6) are the operations executed by the normalization circuit 22 and 21.

Figure 1C:
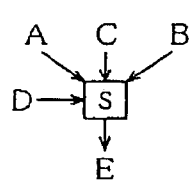

FIG. 1C schematically shows a function of the S macro operation circuit. Input signals A, B and C are input, and a fixed number D is input to output the sum signal E.

Figure 1D:
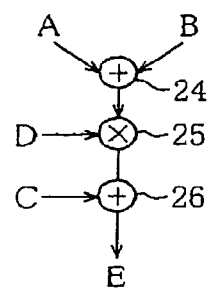

FIG. 1D is a block diagram showing a logical operation of the S macro operation circuit. The adding unit 24 inputs A and B and outputs the sum signal. A multiplication circuit 25 receives the sum signal of the addition circuit 24, and multiplies the fixed number D to supply the output. The addition circuit 26 inputs the output of the multiplication circuit 25 and the input signal C to output the sum signal E.

Here, the input signal A, B and C are the signals to be input sequentially, and the inputting order is A, C and B. The addition circuit 24 needs to hold the input signal A in some place in order to add the input signals A and B. For that, a buffer circuit can be used.

Figure 1E:
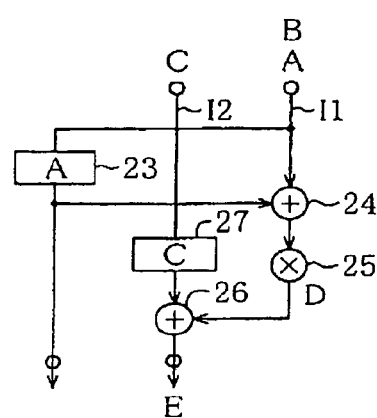

FIG. 1E shows a circuit structure that clearly shows the buffer circuit. For example, the input signal in odd sequence is supplied in an input terminal 11, and the input signal in even sequence is supplied in an input terminal 12.

A buffer circuit 23 stores the input signal A in the first odd sequence. Following to the input signal A, input signals C and B are input. The input signal C is stored in a buffer circuit 27 for an adding circuit 26. When the input signal B is supplied, an adding circuit 24 adds the input signal A stored in the buffer circuit 23 and the input signal 23 newly input, and supplies an output sum signal to a multiplying circuit 25. The multiplying circuit 25 multiplies the output sum signal of the adding circuit 24 by a coefficient D, and supplies the output signal to an adding circuit 26. The adding circuit 26 adds the input signal C stored in the buffer circuit 27 and a newly input signal D, and forms an output signal E. As described in the above, the input of the operation circuits has a buffer memory when necessary.

The wavelet transformation apparatus with 5×3 format corresponds to the structure with the multiplication circuits 16 and 18 and the addition circuits 17 and 19 being omitted from the wavelet transformation apparatus with 9×7 format shown in FIG. 1A as a lifting structure.

Figure 2A:
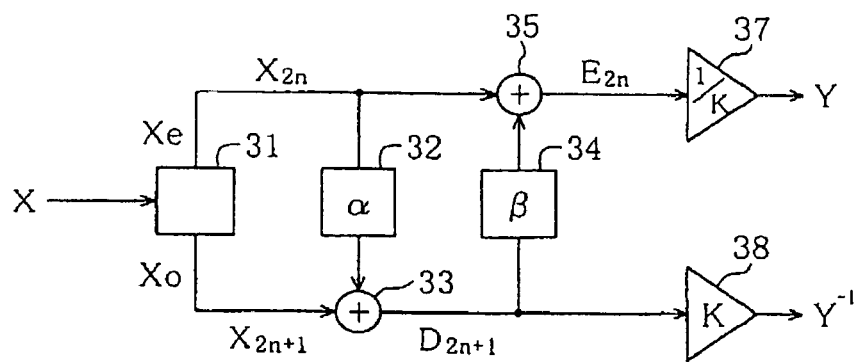
FIGS. 2A to 2F are block diagrams for explaining the wavelet transformation with a 5×3 format.

As shown in FIG. 2A, the input signal X is classified into an odd-numbered input signal X$2n$+1 or an even-numbered input signal X$2n$ by a classification unit 31, and respectively supplied to a signal line Xo or Xe. The even-numbered input signal X$2n$ is supplied to a multiplying circuit 32 and the adding circuit 35. In the multiplying circuit 32, the supplied input signal X$2n$ is multiplied by a coefficient α and supplied to the adding circuit 33. The Adding circuit 33 adds the signal α2Xn supplied from multiplying circuit 32 and the odd-numbered input signal X$2n$+1 supplied from the classification unit 31 and supplies an output signal D$2n$+1 to a multiplying circuit 34 and standardizing circuit 38. The multiplying circuit 34 multiplies the output signal D$2n$+1 by a coefficient β and supplies an output signal βD$2n$+1 to the adding circuit 35. The Adding circuit 35 adds the output signal D2n+1 of the multiplying circuit 34 and the input signal X2n input from the classification unit 31 and supplies an output signal E2n to a standardizing circuit 37.

Figure 2B:
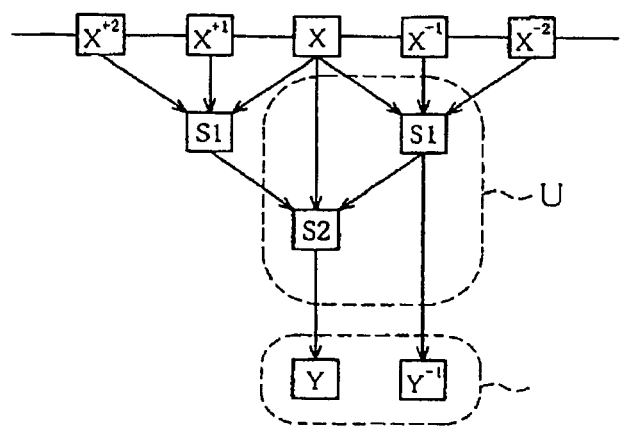

FIG. 2B shows an operation executed by the lifting structure in FIG. 2A. Continuous three inputs signal $X^{-2}$, $X^{-1}$ and X are supplied to a macro S1, and three inputs X, $X^{+1}$ and $X^{+2}$ are supplied to the next macro S1. A macro S2 receives two output signals of the macro S1 to executed the operation. The output signals of the macro S2 are a low frequency component Y, and the output signal of the macro S1 is a high frequency component $Y^{-1}$. Logical operation can be executed if there is a logical circuit U having one macro S1 and one macro S2.

FIG. 3-2 shows converting equations of 5×3 lossless filter. FIG. 3-2A shows converting equations (21) and (22) for forward conversion, and FIG. 3-2B shows converting equations (26) and (27) for invert conversion. The converting equation (21) shows an operation executed by the macro S1, and the converting equation (22) shows an operation executed by the macro S2. Further, symbols look like parenthesis in the equations are a symbol representing a FLOOR operation. Similar to the 9×7 format, equations for the forward conversion and the invert conversion represent contrast to each other; therefore, the operations can be executed by the same circuit.

Figure 2C:
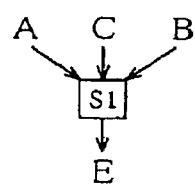

FIG. 2C shows functional symbols of the macro S1. An output signal E is supplied in accordance with input signals A, B, and C.

Figure 2E:
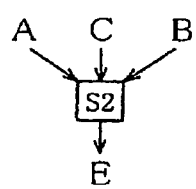
Figure 2D:
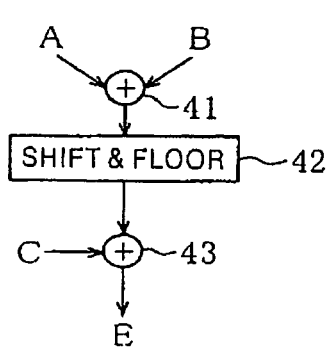

FIG. 2D is a block diagram of dividing the operation of the macro S1. The input signals A and B are supplied to the adding unit 41, and the output is shifted one place lower (a half multiplication) and supplied to the adding unit 43. The adding unit 43 adds the output of the SHIFT/FLOOR circuit 42 and the input signal C and forms an output signal E. The SHIFT/FLOOR circuit can execute changing a numerical place (SHIFT) of a binary signal and changing a bit number (FLOOR) of a binary signal.

FIG. 2E shows functional symbols of the macro S2. An output signal E is supplied in accordance with input signals A, B, and C.

Figure 2F:
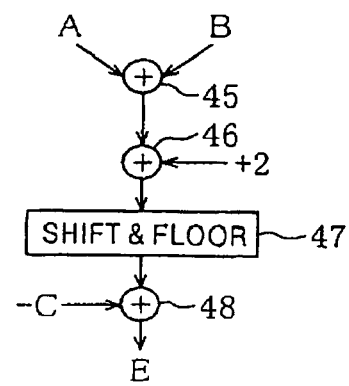

FIG. 2F is a block diagram of dividing the operation of the macro S2. The input signals A and B are supplied to the adding unit 45, and the output (the sum signal) is supplied to the adding unit 46. The adding unit 46 adds a fixed value (+2) to the sum signal and supplies it to the SHIFT/FLOOR circuit 47. The SHIFT/FLOOR circuit 47 moves the binary signal to lower two bits (¼ multiplication) and supplies it to the adding unit 48. The adding unit 48 subtracts C from the place-shifted sum signal and forms the output E.

In the 5×3 format, the structures of the macro S1 and macro S2 are not the same. The macro S2 needs the adding unit 46.

The inventor of the present invention considered forming a wavelet transformation apparatus that can execute both the operations for the 9×7 format and for the 5×3 format.

Figure 4A:
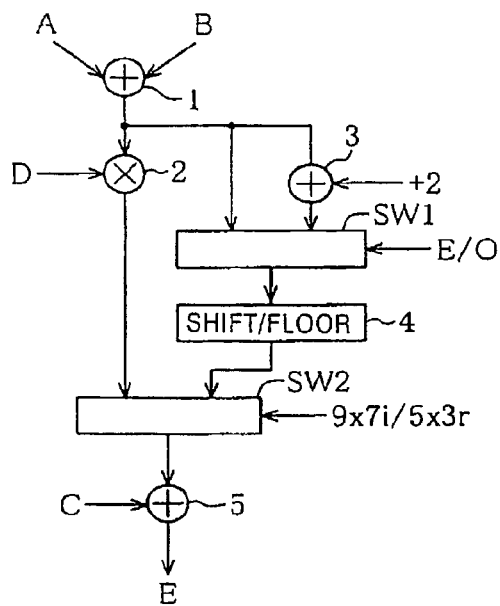
FIGS. 4A to 4D are block diagram showing a structure of a wavelet transformation apparatus according to an embodiment of the present invention.

FIG. 4A shows a structure of a basic unit that can execute the operations for the 9×7 format and for the 5×3 format. The adding unit 1 adds the input signals A and B. The multiplying unit 2 receives the sum signal that is an output of the adding unit 1 and multiplies it by the fixed number D. The adding unit 3 adds the fixed number (+2) and the sum signal that is an output signal of the adding unit 1 and supplies it to a switching switch SW1. The switching switch SW1 switches the output signal of the adding unit 1 and the output signal of the adding unit 3 in accordance with odd and even of the signal order. The SHIFT/FLOOR circuit 4 receives the output signal of the switching switch SW1 to execute SHIFT/FLOOR operation depending on odd or even. The switching switch SW2 switches the output signal of the multiplying unit 2 and the output signal of the SHIFT/FLOOR circuit 4 in accordance with the operation format. That is, when the operation of the 9×7 format is executed, the output of the multiplying unit 2 is passed through, and when the operation of the 5×3 format is executed, the output of the SHIFT/FLOOR circuit 4 is passed through. The adding unit 5 adds the output signal and the input signal C of the switching switch SW2 to form the output signal E.

Figure 4B:
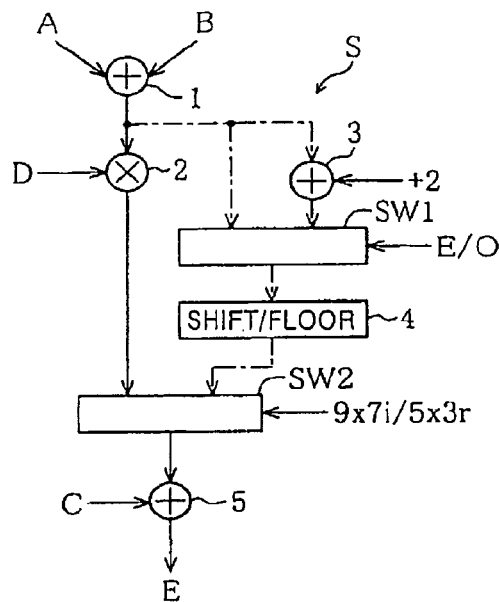

FIG. 4B shows a function of the unit wherein the switching switch SW2 selects the 9×7 format. As shown by a broken line, the components on the right side of the drawing will not function. The adding unit 1 receives the input signals A and B and supplies sum of the signals (the sum signal) to the multiplying unit 2. The multiplying unit 2 multiplies the sum signal by the fixed value D and supplies it to the adding unit 5. The adding unit 5 adds the signal supplied from the multiplying unit 2 and the input signal C and forms the output E.

Figure 4C:
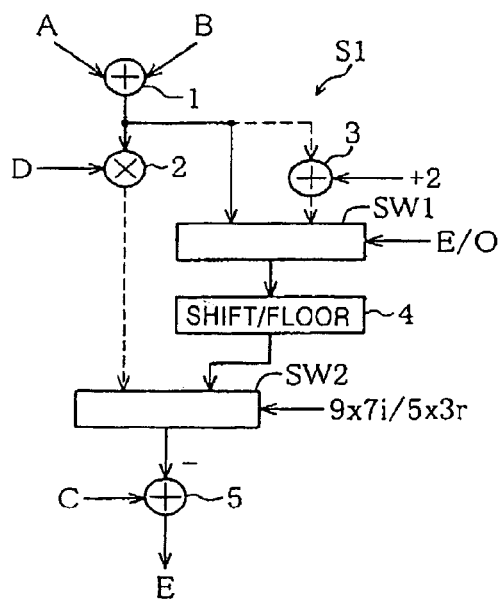

FIG. 4C shows a function of the unit wherein the switching switch SW2 selects the 5×3 format, and the switching switch SW1 executes the operation of the macro S1 in accordance with odd or even of the input signal. The components shown by a broken line will not function as a circuit. The adding unit 1 adds the input signals A and B and supplies the sum signal to the SHIFT/FLOOR circuit 4. The SHIFT/FLOOR circuit 4 shifts the input signal by one bit lower (½ multiplication) and supplies the output signal to the adding unit 5. The adding unit 5 subtracts the output signal of the SHIFT/FLOOR circuit 4 from the input signal C and forms output E.

Figure 4D:
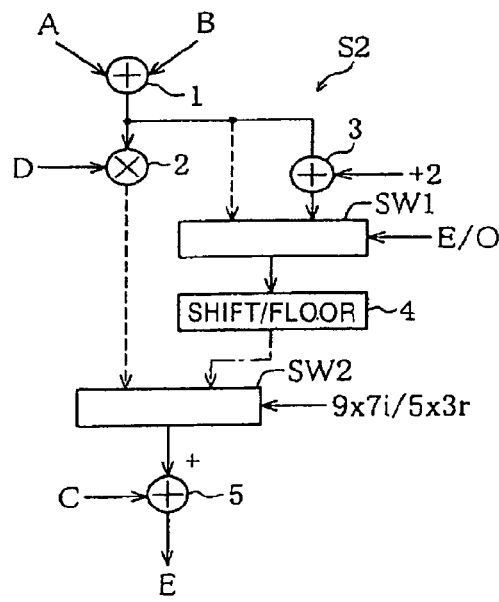

FIG. 4D shows a function of the unit wherein the switching switch SW2 selects the 5×3 format, and the switching switch SW1 executes the operation of the macro S2 in accordance with odd or even of the input signal. The components shown by a broken line will not function as a circuit. The adding unit 1 adds the input signals A and B and supplies the sum signal to the adding unit 3. The adding unit 3 adds the fixed value (+2) to the input signal and supplies the sum signal to the SHIFT/FLOOR circuit 4. The SHIFT/FLOOR circuit 4 shifts the input signal by two bits lower (¼ multiplication) and supplies the output signal to the adding unit 5. The adding unit 5 subtracts the output signal of the SHIFT/FLOOR circuit 4 from the input signal C and forms output E.

As described in the above, by switching the switching circuits SW1 and SW2 for switching functions of the SHIFT/FLOOR circuit 4 similar to the switching circuit SW1, the unit circuit shown in FIG. 4A functions as three types of logical circuits shown in FIG. 4B, FIG. 4C and FIG. 4D. Comparing to a case that the 9×7 circuit and the 5×3 circuit are formed individually, the adding units 1 and 5 are commonly used. Moreover, in the case of executing the operation of the 5×3 format, the macro S1 and the Macro S2 are realized by the same circuit.

Further, in the 9×7 format, although the calculation circuit T shown in FIG. 1B is a necessary circuit, the operations included in the calculation circuit T do not have to be executed simultaneously. The circuit T-1 and the circuit T-2 have the same structure. When necessary buffer memory and switching tap are equipped to a circuit corresponding to the circuit T-1 as a circuit unit, the operations of the circuit T01 and T-2 are executed by the same circuit. By using the circuit unit shown in FIG. 4A, various functions are realized by the same circuit; therefore, various wavelet transformations can be executed by a simple circuit structure.

Figure 5:
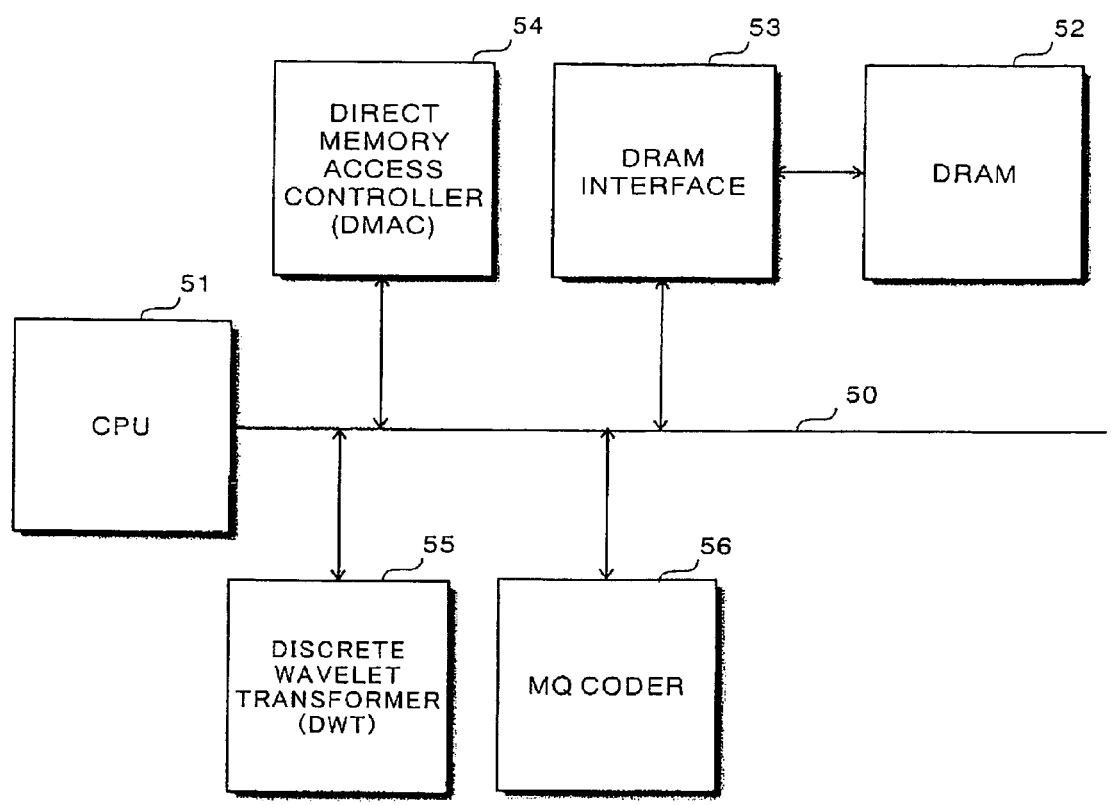
FIG. 5 is a block diagram showing an image processing apparatus equipped with the wavelet transformation function.
Figure 6A:
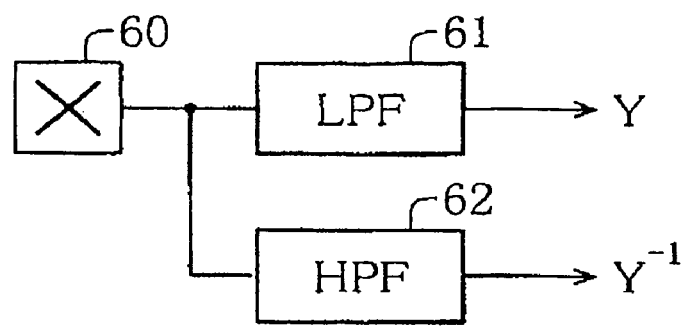
FIG. 6 are a block diagram and a plan view schematically showing the wavelet transformation according to the prior art.
Figure 6B:
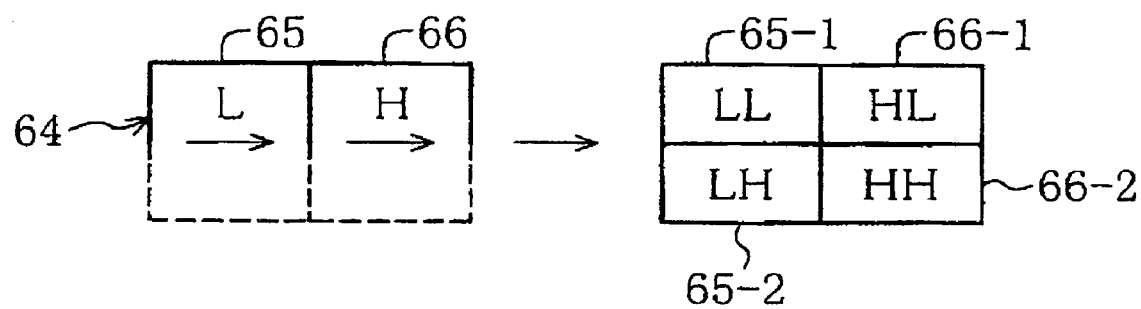

FIG. 5 shows a structure of an image processing apparatus equipped with a wavelet operation circuit. A CPU 51, a DRAM interfaces 53, a direct memory access controller 54, a discrete wavelet converter 55 and an MQ coder 59 are connected to a bus 50. A DRAM 52 is connected to the DRAM interface 53. For example, the discrete wavelet converter 55 executes the wavelet transformation to an image signal stored in the DRAM 52, and compressed image signal is supplied to the MQ coder 59 that executes coding process of JPEG2000. Read and Write to and from the DRAM 52 is controlled by the direct memory access controller 54. By equipping the JPEG200 compression and decompression system independently from the operation of the CPU 51, fast image processing can be realized.

The present invention has been described in connection with the preferred embodiments. The invention is not limited only to the above embodiments. It is apparent that various modifications, improvements, combinations, and the like can be made by those skilled in the art.

What is claimed is:

1. A wavelet transformation apparatus including a unit the unit comprising:
    a first adding device that adds a first input signal and a second input signal input by a predetermined order;
    a first multiplying device that multiplies an output of the first adding device with a coefficient;
    a second adding device that adds a fixed value to the output of the first adding device;
    a first switching device that switches the output of the first adding device and an output of the second adding device;
    a second multiplying device that multiplies an output of the first switching device with a coefficient;
    a second switching device that switches an output of the first multiplying device and an output of the second multiplying device; and
    a third adding device that adds a third input signal of a predetermined order to an output of the second switching device,
    wherein the second switching device selects the output of the first multiplying device when a 9×7 format and the output of the second multiplying device when a 5×3 format.

2. The wavelet transformation apparatus according to claim 1, wherein the first and the second input signals are continuous odd-numbered signals and the third input signal is an even-numbered signal between the first and the second input signals.

3. The wavelet transformation apparatus according to claim 1, wherein the first switching device selects input in accordance with odd or even of the input signals.

4. The wavelet transformation apparatus according to claim 1, wherein the second multiplying device changes the coefficient in accordance with odd or even of the input signals.

5. The wavelet transformation apparatus according to claim 4, wherein the coefficients of the second multiplying device are ½ and ¼.

6. The wavelet transformation apparatus according to claim 1, wherein the second multiplying device is a SHIFT/FLOOR circuit that changes a numerical place of the input signals.

7. The wavelet transformation apparatus according to claim 1, wherein the fixed value of the second multiplying device is 2.

8. The wavelet transformation apparatus according to claim 1, wherein the first adding device is equipped with a buffer memory at one input terminal.

9. The wavelet transformation apparatus according to claim 1, further comprising another unit having same structure as the unit, and wherein an output signal of the third adding device of the unit is an input signal of a first adding device of the another unit.

10. A wavelet transformation apparatus including a unit the unit comprising:
    a first adding device that adds a first input signal and a second input signal input by a predetermined order;
    a first multiplying device that multiplies an output of the first adding device with a coefficient;
    a second adding device that adds a fixed value to the output of the first adding device;
    a first switch device that switches the output of the first adding device and an output of the second adding device;
    a second multiplying device that multiplies an output of the first switching device with a coefficient;
    a second switching device that switches an output of the first multiplying device and an output of the second multiplying device; and
    a third adding device that adds a third input signal of a predetermined order to an output of the second switching device,
    wherein the second multiplying device changes the coefficient in accordance with odd or even of the input signals, and
    wherein the coefficients of the second multiplying device are ½ and ¼.

* * * * *